Sept. 22, 1953 H. A. MUSK ET AL 2,653,223
ANTENNA TUNING CONTROL FOR RADIO TRANSMITTERS
Filed Nov. 13, 1950 2 Sheets-Sheet 1

WITNESSES:
E. G. McCloskey
Wm. L. Groome

INVENTORS
Henry A. Musk and
John G. Hammond.
BY
F. E. Browder
ATTORNEY

ANTENNA TUNING CONTROL FOR RADIO TRANSMITTERS

Filed Nov. 13, 1950 2 Sheets-Sheet 2

WITNESSES:

E. A. McCloskey

[signature]

INVENTORS
Henry A. Musk and
John G. Hammond.
BY
[signature]
ATTORNEY

Patented Sept. 22, 1953 2,653,223

UNITED STATES PATENT OFFICE 2,653,223

ANTENNA TUNING CONTROL FOR RADIO TRANSMITTERS

Henry A. Musk, Glen Burnie, and John G. Hammond, Baltimore, Md., assignors to Westinghouse Electric Corporation, East Pittsburgh, Pa., a corporation of Pennsylvania Application November 13, 1950, Serial No. 195,246

14 Claims. (Cl. 250—17)

This invention relates to circuits for reactance modulating tuned circuits for controlling their resonant frequency, and relates more particularly to circuits for reactance modulating the antenna circuits of frequency modulated radio transmitters, for maintaining such antenna circuits tuned to the instantaneous frequencies of the transmitters.

In military communication systems where dependability is of prime importance, very low frequencies, down to 15 kc., of the radio spectrum are used, since the ground waves in which the energy at such frequencies is transmitted, are but slightly subject to fading and to daily and seasonal variations. The high Q factor of an antenna of reasonable size for use at such low frequencies has introduced a difficulty due to the fact that when the frequency of a driving signal is suddenly changed, the circulating current in the antenna circuit consists of a signal at the original frequency which is decaying exponentially from the moment of frequency change, and a new signal which builds up exponentially at the same moment. In high Q, low frequency circuits, the time required for new equilibrium conditions to be established following each frequency change may be so long as to approach the modulation rate, or in frequency shift keyed, telegraph systems, the time of mark or space signal, requiring a decrease in the modulation rate, or in the keying speed, for avoiding distortion in the transmitted signals. Such difficulties may be overcome by maintaining the resonant frequency of the antenna the same as the instantaneous transmitter frequency.

This invention provides reactance modulation of a tuned circuit such as an antenna circuit. Prior systems using reactance modulation have been used, but have the disadvantages that excessive power from the transmitter is required, resulting in low transmitter efficiency or in amplitude modulation of the radiated signal; that excessive external power relative to the power output of the transmitter, is required; that they are limited to non-complex modulation unless complicated circuits are used, and that non-standard components are required. The invention overcomes these disadvantages by using for a reactance modulator, a vacuum tube which draws plate current 90° out-of-phase with the alternating current component of the plate voltage in such a manner that the plate dissipation is minimum.

In one embodiment of the invention, the control grid of a reactance tube connected to a tuned circuit to be modulated, is excited by narrow pulses 90° out-of-phase with the alternating current component of the plate voltage, whereby the resulting plate current flows in narrow pulses at times when the plate voltage is relatively low, the operation being similar to that of a class "C" amplifier.

An object of the invention is to improve reactance modulated circuits.

Another object of the invention is to reduce the power required for reactance modulating a tuned circuit.

Another object of the invention is to excite the control grid of a reactance modulator tube having its plate connected to a tuned circuit in which alternating current flows, with a narrow pulse 90° out-of-phase with the alternating current component of the plate voltage.

Another object of the invention is to provide a reactance tube modulator having characteristics similar to those of a class "C" amplifier.

Another object of the invention is to maintain the resonant frequency of the antenna of a frequency modulated transmitter at the instantaneous frequency of the transmitter by reactance modulating the antenna circuit with a reactance tube, to the control grid of which, narrow exciting pulses 90° out-of-phase with the alternating current component of its plate voltage, are applied when the transmitter is modulated.

The invention will now be described with reference to the annexed drawings, of which:

Figure 1:
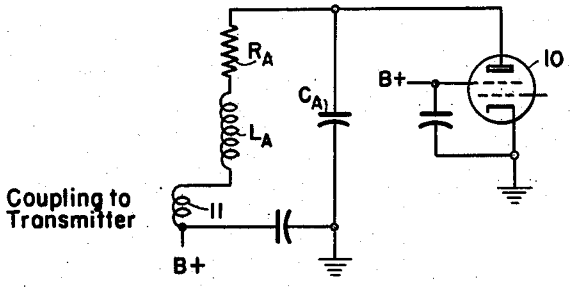
Fig. 1 is a simplified circuit of a reactance tube modulator embodying this invention.
Figure 2:
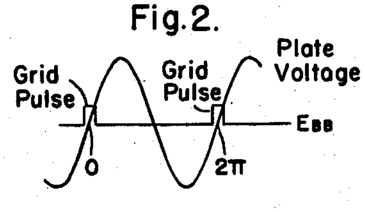
Fig. 2 is a graph, not to scale, illustrating the phase relationship between the exciting pulses applied to the control grid of the tube of Fig. 1, and the alternating current component of the voltage at its plate.

Referring first to Figs. 1 and 2 of the drawings, the plate of the reactance tube 10 is coupled through the coil 11 to a transmitter, and receives therefrom the alternating current voltage illustrated by Fig. 2. The control grid of the tube is excited by narrow pulses which, as illustrated by Fig. 2, are 90° out-of-phase with the alternating current voltage. The values $R_A$, $L_A$ and $C_A$ illustrated by Fig. 1 are antenna constants.

Figure 3:
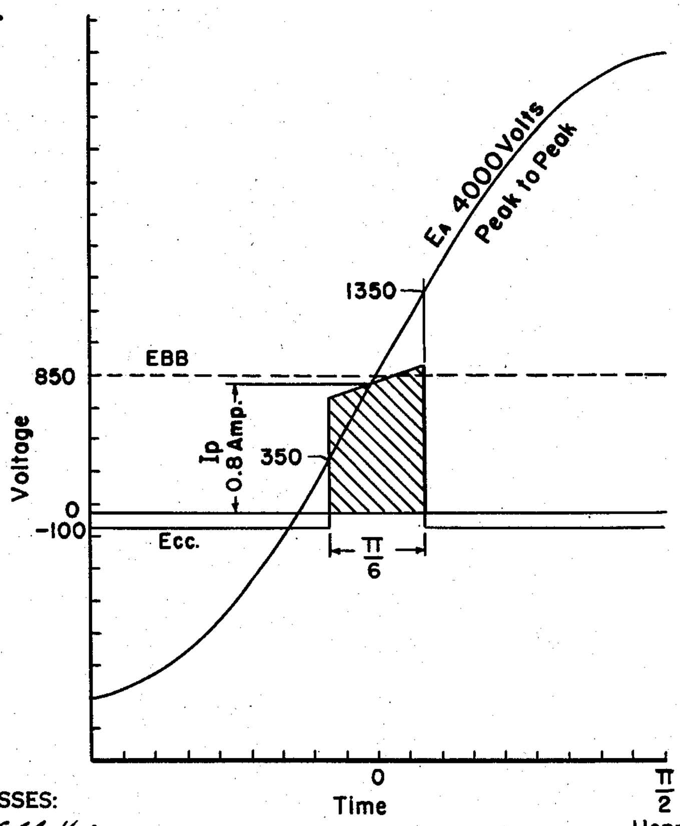
Fig. 3 is a graph illustrating the voltage-current wave-forms of the tube.

Referring now to Fig. 3 of the drawings, a direct current pulse 30° wide is applied to the grid of a reactance tube, the plate of which has an alternating current voltage of 4,000 volts derived from the antenna circuit. Plate current is drawn only during the rise of the plate voltage from 350 to 1350, the plate voltage thus being relatively low during the time plate current is being drawn. It is this feature which results in this circuit being different from, and considerably more efficient than, conventional reactance tube circuits.

The amplitude and width of the pulses are chosen to supply a reactive current at the fundamental frequency which is sufficient to shift the resonant frequency of the tuned antenna circuit an amount $Fo/2Q$ where $Fo$ is the frequency of the unmodulated antenna, and Q is the Q factor of the antenna. The D. C. plate voltage applied to the tube is made just high enough to supply the required plate current. Under these conditions it has been determined that the power dissipated in the plate of the reactance tube is approximately one-half the power being fed the antenna circuit. Since the plate current and the plate voltage are made exactly 90° out-of-phase, the power dissipated in the reactance tube is obtained entirely from the external power supply. Thus the reactance tube requires no power from the antenna circuit, and causes no amplitude modulation of the radiated signal. The usual class "A" reactance tube performing the same function would have a plate dissipation in the order of from three to four times the antenna power. Thus this class "C" reactance tube is from six to eight times more efficient than a class "A" reactance tube.

Figures 4, 5:
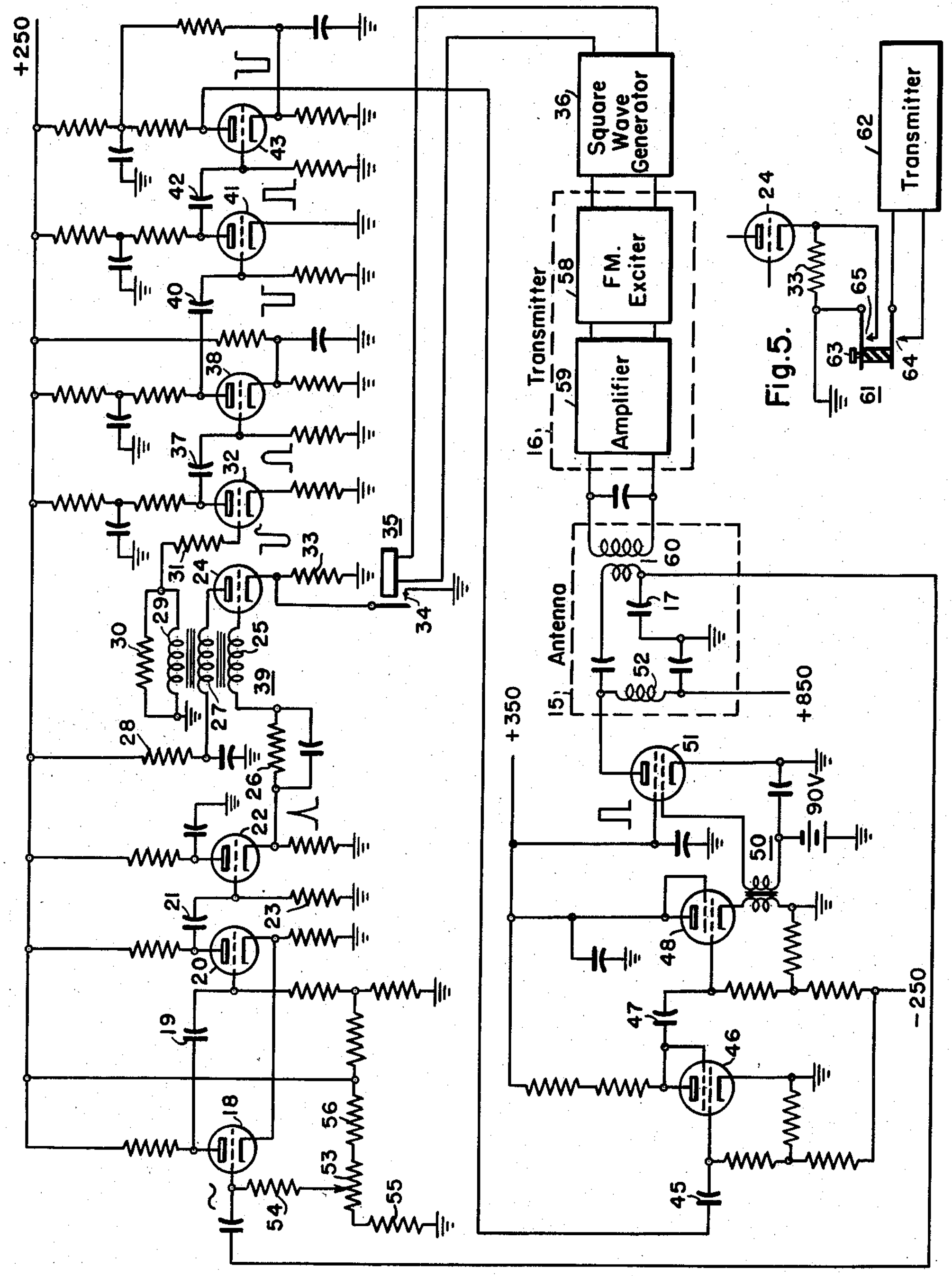
Fig. 4 is a circuit schematic of a complete reactance tube circuit embodying this invention utilizing a square-wave generator for modulating a transmitter.
Fig. 5 is a circuit schematic illustrating how the circuit of Fig. 4 would be modified for using the keyer of a frequency-shift keying system instead of a square-wave generator, for modulating a transmitter.

Fig. 4 of the drawings illustrates a laboratory circuit used for proving the efficiency and fidelity of the invention, using for this purpose a square-wave generator for applying square-wave modulation both to the antenna modulator, and the transmitter. It should be understood, however, that if the pulse input to the tube 48 is amplitude modulated according to a complex modulation pattern instead of a square-wave, the complex modulation will be transmitted without distortion the same as the square-wave.

Referring now to Fig. 4, the dummy antenna 15 simulates a high Q antenna, and is coupled to a 15 kc./s. transmitter 16. A fraction of the antenna voltage developed across the capacitor 17 in the antenna circuit is applied to the grid of the squarer-clipper tube 18, the plate of which is connected through the coupling capacitor 19 to the grid of the squarer-clipper tube 20. The plate of the tube 20 is connected through the capacitor 21 to the grid of the tube 22 which is connected through the resistor 23 to ground. The capacitor 21 and the resistor 23 form a differentiator.

The grid of the blocking oscillator tube 24 is connected through the series-connected winding 25 of the transformer 39, and resistor 26, to the cathode of the tube 22, and receives therefrom, a pulse which is 90° out-of-phase with the alternating current voltage at the grid of the tube 18. The plate of the tube 24 is connected through the series-connected winding 27 of the transformer 39 and the resistor 28, to +250 volts.

The winding 27 is inductively coupled to the transformer windings 25 and 29, the latter being shunted by the resistor 30, and connected at one end to ground, and at its other end through the resistor 31 to the grid of the keying amplifier tube 32.

The cathode resistor 33 of the tube 24 is shunted by the contacts 34 of the relay 35, the energizing winding of which is connected to the square-wave generator 36 and to ground. With no modulation of the transmitter, the contacts 34 are open and the tube 24 is biased below cut-off. When the transmitter is modulated, the bias resistor 33 is shorted out so that a positive pulse from the cathode of the tube 22 can trigger the tube 24.

The plate of the amplifier tube 32 is connected through the coupling capacitor 37 to the grid of the keying amplifier tube 38, the plate of which is connected through the coupling capacitor 40 to the grid of the clipping-shaping tube 41. The plate of the tube 41 is connected through the coupling capacitor 42 to the grid of the clipping-shaping tube 43, the plate of which is connected through the coupling capacitor 45 to the grid of the amplifier tube 46.

The plate of the tube 46 is connected through the coupling capacitor 47 to the control grid of the amplifier tube 48.

The cathode of the tube 48 is connected through the primary winding of the impedance matching-isolation transformer 50 to ground. The secondary winding of the transformer 50 is connected to the control grid of the reactance modulator tube 51, the plate of which is connected to the antenna circuit 15, and through the choke 52 to +850 volts. The screen grid of the tube 51 is connected to +350 volts.

The potentiometer 53, the slider of which is connected through the resistor 54 to the grid of the clipper tube 18, and which is connected through the resistor 55 to ground, and through the resistor 56 to +250 volts, is provided for adjusting the phase of the voltage applied from the antenna circuit to the grid of the tube 18.

The transmitter 16 comprises the FM exciter 58 and the amplifier 59, to the coil 60 of which, the antenna 15 is coupled. In the system of Fig. 4, the square-wave generator modulates the transmitter.

In operation, the transmitter 16 supplies energy to the antenna 15, and alternating current voltage from the antenna is supplied to the grid of the first squarer-clipper tube 18. The squarer-clipper tubes 18 and 20 change the sine-wave voltage applied to the grid of the tube 18, to a square-wave, this square-wave being differentiated in the input circuit of the tube 22. The output of the tube 22 taken from its cathode consists of a positive pulse 90° out-of-phase with the antenna voltage from which the pulse originates. The pulse from the cathode of the tube 22 triggers the grid of the blocking oscillator tube 24 when its cathode resistor 33 is shorted out by the contacts 34 when the transmitter is modulated, the tube 24, together with the transformer 39, then serving to generate a pulse of the width required to excite the grid of the reactance tube.

The pulse from the blocking oscillator is amplified, clipped and shaped in the circuits of the tubes 38, 41 and 43, and is amplified to the required level by the amplifier tube 46. The amplifier tube 48 and the transformer 50 match the impedance of the pulse generator to that of the grid of the reactance tube 51.

Since the plate of the tube 51 is connected directly to the antenna, its plate current is exactly 90° out-of-phase with the antenna voltage. The effect of the reactive current drawn by the reactance tube 51 is to shift the resonant frequency of the antenna circuit an amount determined by the value of the reactive current.

If the pulse voltage at the grid of the reactance tube 51 is not exactly 90° out-of-phase with its alternating plate voltage, it can be made so by adjusting the slider of the potentiometer 53 which adjusts the symmetry of clipping.

As illustrated by Fig. 5, the square-wave generator of Fig. 4 may be replaced by the keyer 61 of a frequency-shift keying transmitter 62. When the key 63 is depressed, it closes the contact 64 for keying the transmitter, and at the same time, closes the contacts 65 which are connected to the opposite ends of the bias resistor 33 of the blocking oscillator tube 24. Thus when the transmitter is keyed so that its frequency is changed, the tube 24 normally biased so far below cut-off by the bias resistor 33 that it cannot be triggered by positive pulses from the cathode of the tube 22, has its bias reduced by the shorting out of the resistor 33 so that it can be triggered by such positive pulses. The resultant application of the pulses to excite the grid of the reactance tube 51 causes its reactance to change so as to tune the antenna circuit to the new frequency.

We claim as our invention:

1. In combination, a source of alternating current, a load circuit coupled to said source, a reactance tube having an anode connected to said circuit, and having a control electrode, means providing a voltage pulse 90° out-of-phase with the alternating current at said anode and which has a duration substantially smaller than that of a quarter-cycle thereof, and means for applying said voltage pulse to said control electrode.

2. The invention claimed in claim 1 in which the means for providing the voltage pulse, includes means utilizing voltage from the load circuit.

3. In combination, a source of radio frequency current, a load circuit coupled to said source, a reactance tube having an anode connected to said circuit, and having a control electrode, means for changing the frequency of said source, means providing a voltage pulse 90° out-of-phase with the alternating current voltage at said anode and having a duration substantially less than that of a quarter-cycle thereof, and means for applying said voltage pulse to siad control electrode when said frequency changing means changes the frequency of said source.

4. The invention claimed in claim 3 in which the means for providing voltage pulse includes means deriving voltage from the load circuit.

5. Frequency modulation apparatus comprising a frequency modulation transmitter, an antenna circuit for said transmitter, a reactance tube having an anode connected to said circuit, and having a control electrode, means for modulating said transmitter, means providing a voltage pulse 90° out-of-phase with the voltage of the current at said anode and having a duration substantially less than a quarter-cycle thereof, and means actuated by said modulating means for applying said voltage pulse to said control electrode.

6. In combination, a source of variable frequency, radio frequency current, a load circuit coupled to said source, a reactance tube having an anode connected to said circuit, and having a control electrode, means for frequency modulating said source, means utilizing voltage derived from said source and providing a voltage pulse which is 90° out-of-phase with the voltage of the current at said anode and which has a duration substantially less than a quarter-cycle thereof, and means controlled by said modulating means for applying said pulse to said control electrode.

7. The invention claimed in claim 6 in which the source is a frequency modulation transmitter, and the load circuit is an antenna circuit.

8. In combination, a source of variable frequency, radio frequency current, a load circuit coupled to said source, a reactance tube having an anode connected to said circuit, and having a control electrode, means for frequency modulating said source, means deriving sine-wave voltage from said circuit, means utilizing said sine-wave voltage for providing square-wave voltage, means utilizing said square-wave voltage for providing a positive pulse 90° out-of-phase with said sine-wave voltage, means including a blocking oscillator triggered by said pulse for providing a pulse having a duration a fraction of a quarter-cycle of said sine-wave voltage, and means for applying said last mentioned pulse to said control electrode when said modulation means modulates said source.

9. The invention claimed in claim 8 in which the source is a frequency modulation transmitter and the load circuit is an antenna circuit.

10. In combination, a source of variable frequency, radio frequency current, a load circuit coupled to said source, a reactance tube having an anode connected to said circuit, and having a control electrode, means deriving sine-wave voltage from said circuit, means utilizing said sine-wave voltage for providing square-wave voltage, means utilizing said square-wave voltage for providing a first positive pulse 90° out-of-phase with said sine-wave voltage, means including a blocking oscillator for providing a second positive pulse having a duration substantially less than a quarter-cycle of said sine-wave voltage, means utilizing said first positive pulse for triggering said oscillator, and means for applying said second positive pulse to said control electrode.

11. The invention claimed in claim 10 in which the source is a frequency modulation transmitter, and the load circuit is an antenna circuit.

12. The invention claimed in claim 6 in which means is provided for adjusting the phase relationship between the pulse and the voltage of the current at the reactance tube anode.

13. The invention claimed in claim 8 in which means is provided for adjusting the phase relationship between the pulse and the sine-wave voltage.

14. The invention claimed in claim 10 in which means is provided for adjusting the phase relationship between the first positive pulse and the sine-wave voltage.

HENRY A. MUSK.
JOHN G. HAMMOND.

References Cited in the file of this patent

UNITED STATES PATENTS

| Number | Name | Date |
|---|---|---|
| 2,358,454 | Goldstine | Sept. 19, 1944 |
| 2,389,879 | Tunick | Nov. 27, 1945 |
| 2,436,796 | De Rosa | Mar. 2, 1948 |
| 2,480,820 | Hollingsworth | Aug. 30, 1949 |